United States Patent
Rice

(10) Patent No.: US 8,988,903 B2
(45) Date of Patent: Mar. 24, 2015

(54) SYSTEMS AND METHODS FOR PROTECTING A SWITCH MODE POWER SUPPLY

(75) Inventor: Raymond W. Rice, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 159 days.

(21) Appl. No.: 13/493,291

(22) Filed: Jun. 11, 2012

(65) Prior Publication Data

US 2013/0329475 A1  Dec. 12, 2013

(51) Int. Cl.
  *H02M 3/335* (2006.01)
  *H02M 1/32* (2007.01)

(52) U.S. Cl.
  CPC ............ *H02M 1/32* (2013.01); *H02M 3/33523* (2013.01)
  USPC .................. 363/21.15; 363/21.17; 363/21.18; 363/90

(58) Field of Classification Search
  USPC .............. 363/18, 19, 20, 21.01, 21.04, 21.07, 363/21.08, 21.1, 21.11, 21.12, 21.15, 21.16, 363/21.17, 21.18, 56.01, 56.11; 361/18, 21, 361/90
  See application file for complete search history.

(56) References Cited

U.S. PATENT DOCUMENTS

| | | | |
|---|---|---|---|
| 3,733,519 A | 5/1973 | Griffey | |
| 4,447,841 A | 5/1984 | Kent | |
| 4,649,467 A | 3/1987 | Vesce | |
| 4,763,238 A | 8/1988 | Maige | |
| 4,928,200 A | 5/1990 | Redl | |
| 5,841,642 A | 11/1998 | Fitzgerald | |
| 5,901,054 A * | 5/1999 | Leu et al. ........................ | 363/41 |
| 6,088,244 A | 7/2000 | Shioya | |
| 6,424,512 B1 | 7/2002 | Schmacht | |
| 7,230,409 B1 | 6/2007 | Cox | |
| 7,446,988 B2 | 11/2008 | Balakrishnan | |
| 7,764,476 B2 | 7/2010 | Ker | |
| 7,773,350 B2 | 8/2010 | Balakrishnan | |
| 8,050,006 B2 | 11/2011 | Doppel | |
| 8,537,570 B2 * | 9/2013 | Balakrishnan et al. ..... | 363/21.01 |
| 2007/0153554 A1 * | 7/2007 | Matsumoto ..................... | 363/16 |
| 2007/0274112 A1 | 11/2007 | Lalithambika | |
| 2010/0202167 A1 | 8/2010 | Yang | |
| 2010/0302813 A1 * | 12/2010 | Lu et al. ..................... | 363/21.01 |
| 2011/0260703 A1 | 10/2011 | Laur | |

OTHER PUBLICATIONS

Philips Semiconductors, Power Semiconductor Applications, Chapter 2—Switched Mode Power Supplies, 1994.
PCT/US2013/044763 Patent Cooperation Treaty, International Search Report and Written Opinion of the International Searching Authority, Nov. 22, 2013.

* cited by examiner

*Primary Examiner* — Nguyen Tran
(74) *Attorney, Agent, or Firm* — Stoel Rives LLP; Richard M. Edge

(57) ABSTRACT

The present disclosure provides systems and methods for protecting a switch mode power supply (SMPS). An SMPS may include an input power connector, an input rectifier and filter, a transformer, an output rectifier and filter, and an output power connector. A control circuit may selectively generate a switching signal for driving the transformer based on a feedback signal and a protection signal generated by a protection circuit. The protection circuit may generate the protection signal with an asymmetric duty cycle oscillating between an enable state and an inhibit state. The protection signal may inhibit the control circuit from generating the switching signal when the protection signal is in the inhibit state. A detection circuit may receive the feedback signal and selectively force the protection signal to the enable state when the feedback signal indicates that an output voltage is too high.

12 Claims, 12 Drawing Sheets

US 8,988,903 B2

SYSTEMS AND METHODS FOR PROTECTING A SWITCH MODE POWER SUPPLY

TECHNICAL FIELD

This disclosure relates to protection circuits in switch mode power supplies. Specifically, this disclosure relates to protection circuits configured to prevent overcurrents and short circuits in switch mode power supplies.

BRIEF DESCRIPTION OF THE DRAWINGS

Non-limiting and non-exhaustive embodiments of the disclosure are described herein, including various embodiments of the disclosure illustrated in the figures listed below.

Figure 1A:
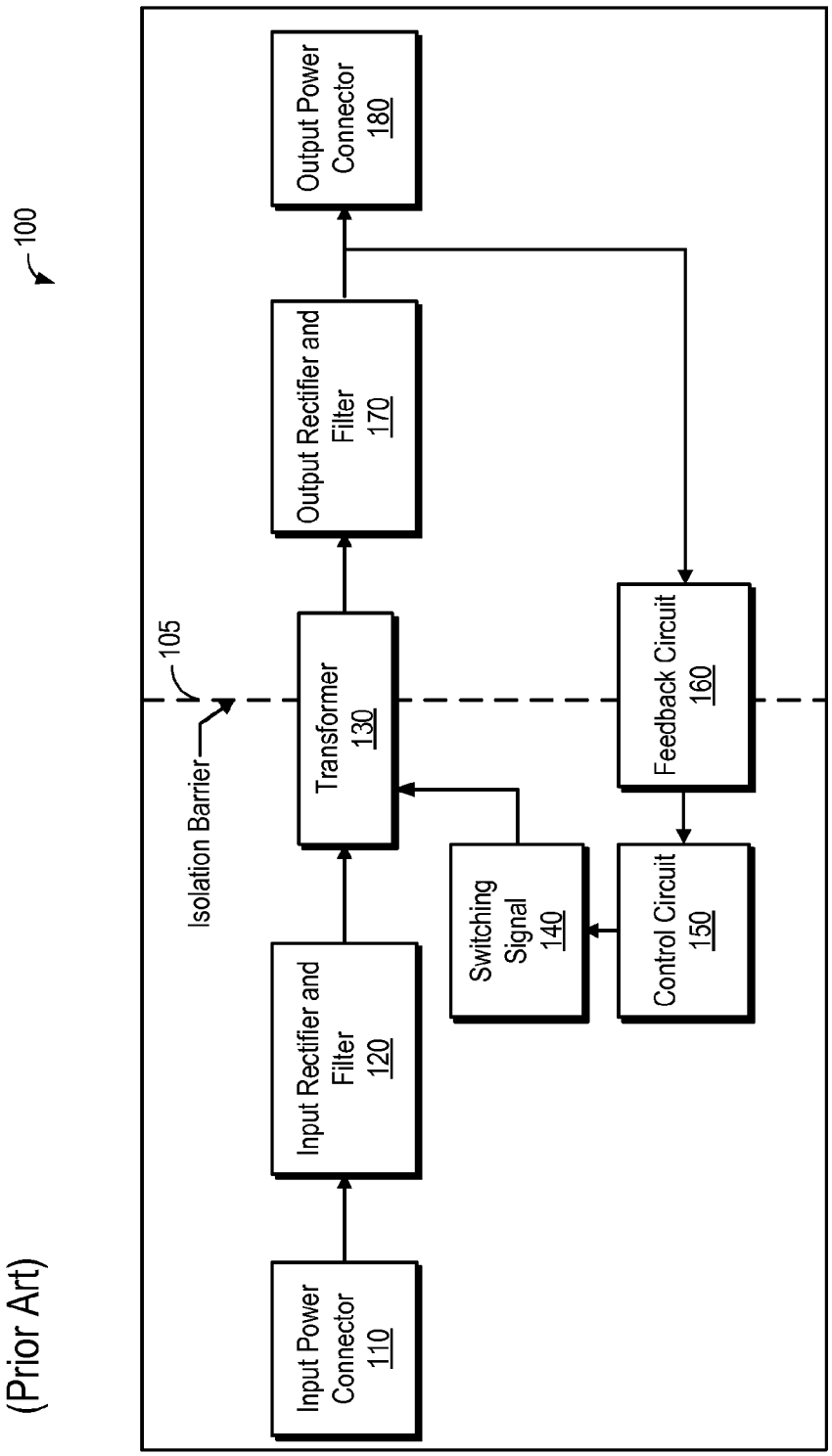
FIG. 1A illustrates an embodiment of block diagram of a switch mode power supply (SMPS), including a feedback circuit and a control circuit.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

According to various embodiments of the present disclosure, a switch mode power supply (SMPS) may include an input power connector, an input rectifier and filter (IRF), a transformer, an output rectifier and filter (ORF), and an output power connector. A feedback circuit may provide a feedback signal associated with the output of the SMPS to a control circuit. The control circuit may selectively generate a switching signal based on the feedback signal (analog or digital). The switching signal may be used to "switch" the direct current (DC) output of the IRF across a primary winding of the transformer, in order to selectively induce a current in the secondary winding(s) of the transformer. Accordingly, the control circuit may adapt the switching signal as needed based on the feedback signal in order to increase or decrease the power output by the SMPS.

In various embodiments, the input power connector may be configured to receive an alternating current (AC) power signal, such as a 110/120 Volt AC or 220/240 Volt AC signal. The AC power signal may be rectified and/or filtered to convert the AC signal to a DC power signal. Alternatively, the input power connector may be configured to receive a DC power signal. Using any of a wide variety of configurations, the DC power signal is "switched" between two or more states (such as on and off or positive and negative) across the primary winding(s) of a power transformer. A switching signal, generated by a control circuit, may control the frequency at which the DC power signal is switched across the primary winding(s) of the power transformer. The control circuit may modify the frequency and/or duty cycle of the switching signal in order to adjust (increase or decrease) the voltage and/or current output by the SMPS.

The relatively high frequency switching of the DC power signal across the primary winding(s) induces an AC current across one or more secondary windings. These AC current(s) may then be rectified and/or filtered in order to produce one or more DC outputs at one or more desired voltages. The DC outputs may be provided to one or more devices via one or more output power connectors. A feedback circuit may generate a feedback signal associated with a DC output and provide it to the control circuit. As previously described, the control circuit may use the feedback signal to modify the frequency and/or duty cycle of the switching signal in order to adjust (increase or decrease) the voltage and/or current of the DC output of the SMPS.

In some embodiments, if the SMPS is heavily loaded, the control circuit may generate a switching signal to try and keep up with the load. If the SMPS is unable to fully satisfy the power demands of the load, the feedback signal may continually indicate that more power is needed. The control circuit may, in turn, generate a switching signal to deliver as much power as possible. Such a situation may be an example of an overloaded SMPS. Some components of the SMPS may be stressed and/or damaged under overload conditions. Additionally and/or alternatively, some components and/or the entire SMPS may overheat and/or become hot enough to pose a safety hazard. Accordingly, an overload condition may result in a safety hazard and/or may render the SMPS inoperable.

Accordingly, the present disclosure provides a protection circuit configured to constrain the average power output of the SMPS. According to various embodiments, the protection circuit may include an oscillation circuit configured to generate a protection signal with an asymmetric duty cycle oscillating between an enable state and an inhibit state. The protection signal may be provided to the control circuit to inhibit the control circuit from generating the switching signal when the protection signal is in the inhibit state. The protection circuit may further include a detection circuit configured to receive the feedback signal from the feedback circuit and selectively force the protection signal to the enable state when the feedback signal indicates that the switching signal is causing the transformer to generate too much power. For example, if the feedback signal is already directing the control circuit to generate less output power, the protection circuit may be forced to an enable state.

In various embodiments, the switching signal may be a relatively high frequency, e.g., between 1 kilohertz and 100 kilohertz or higher. The switching signal may have an asymmetrical duty cycle in some embodiments. The protection signal may be a relatively low frequency, e.g., between 0.5 Hertz and 100 Hertz. The protection signal may have an asymmetrical duty cycle as well. For example, the protection cycle may be in an inhibit state for 90 percent of each cycle and in an enable state for only 10 percent of each cycle. Any of a wide variety of duty cycles may be used depending on the frequency of the protection signal and/or the amount of protection needed. For example, it may be necessary to allow components in the SMPS to cool off for 900 milliseconds for every 100 milliseconds they are heating up while enabled under heavily loaded conditions.

The detection circuit may include a transistor configured to selectively force the protection signal to the enable state. The oscillation circuit may include one or more sine wave and/or square wave inverters. One or more of the inverters in the oscillation circuit may include a feedback network configured to cause the output of the oscillation circuit to oscillate with an asymmetrical duty cycle between 0.5 Hertz and 10 Hertz. A power rail of the inverter may be connected to a power source via a resistor and to a ground terminal via a capacitor. The power rail may be connected to one or more of the DC output of the SMPS, a separate DC signal, and/or a DC power signal prior to the transformer of the SMPS.

The feedback network of an inverter in the oscillation circuit may include any of a wide variety of configurations, including any of the various configurations described herein in conjunction with the figures. Any of a wide variety of modifications and/or alternative configurations may be utilized to generate an identical and/or similar protection signal. The specific examples provided herein are intended as examples, and are not intended to limit the scope of the disclosure in any way.

As is known in the art, the input power connector(s), input rectifier(s), input filter(s) and the primary windings of the transformer maybe electrically isolated from the output side of the SMPS. Similarly, the feedback circuit may monitor the DC output and generate a feedback signal, while still maintaining an electrical isolation between the input side and the output side of the SMPS. For example, the feedback circuit may contain an isolation mechanism, such as opto-couplers, to isolate the DC output from the input side of the SMPS.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components. For example, in many instances a first component may be described herein as "connected" to a second component, when in fact the first component is connected to the second component via a third component, a section of wire, an electrical trace, another first component, another second component, and/or another electrical component.

Certain components described herein, such as inverters, capacitors, resistors, inductors, input connectors, output connectors, transformers, and the like, are described in their broadest sense. One of skill in the art will recognize that various alternative components or configurations may yield an equivalent circuit or equivalent component. Such modifications are considered within the scope of this disclosure.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1A illustrates an embodiment of block diagram of a switch mode power supply (SMPS) 100, including a feedback circuit 160 and a control circuit 150. As is known in the art, an isolation barrier 105 may electrically isolate the input portion of the SMPS 100 and the output portion of SMPS 100. SMPS 100 may include an input power connector 110 configured to receive an alternating current (AC) power signal, such as a 110/120 Volt AC or 220/240 Volt AC signal. SMPS 100 may include an input rectifier and filter (IRF) 120 configured to rectify and/or filter the AC power signal to a DC power signal.

SMPS 100 may be configured to switch the DC power signal between two or more states (such as on and off or positive and negative) across a primary winding(s) of a power transformer 130. A switching signal 140, generated by a control circuit 150, may control the frequency at which the DC power signal is switched across the primary winding(s) of power transformer 130. Control circuit 150 may modify the frequency and/or duty cycle of switching signal 140 in order to adjust (increase or decrease) the voltage and/or current output by SMPS 100.

Feedback circuit 160 may provide a feedback signal to control circuit 150, the feedback signal associated with the DC output of SMPS 100. Control circuit 150 may selectively generate switching signal 140 based on the feedback signal. Switching signal 140 may switch the DC output of the IRF (or the originally input DC power signal) across a primary winding of power transformer 130, in order to selectively induce a current in the secondary winding of power transformer 130. Accordingly, control circuit 150 may adjust switching signal 140 based on the feedback signal in order to increase or decrease the DC output of SMPS 100.

The relatively high frequency switching of the DC power signal across the primary winding(s) induces an AC current across one or more secondary windings of power transformer 130. Accordingly, SMPS 100 may include an output rectifier and/or filter (ORF) 170 configured to rectify the AC current on the secondary winding(s) to generate one or more DC outputs at one or more desired voltages. The DC output(s) may be provided to one or more devices via one or more output power connectors 180. As previously described, feedback circuit 160 may generate a feedback signal associated with the DC output and provide it to control circuit 150. Control circuit 150 may use the feedback signal to modify the frequency and/or duty cycle of switching signal 140 to increase or decrease the voltage and/or current of the DC output of SMPS 180. The feedback signal may be analog or digital. A digital feedback signal may indicate that more or less power are needed in the general sense, and an analog signal may indicate how much more or less power is needed, generally.

Figure 1B:
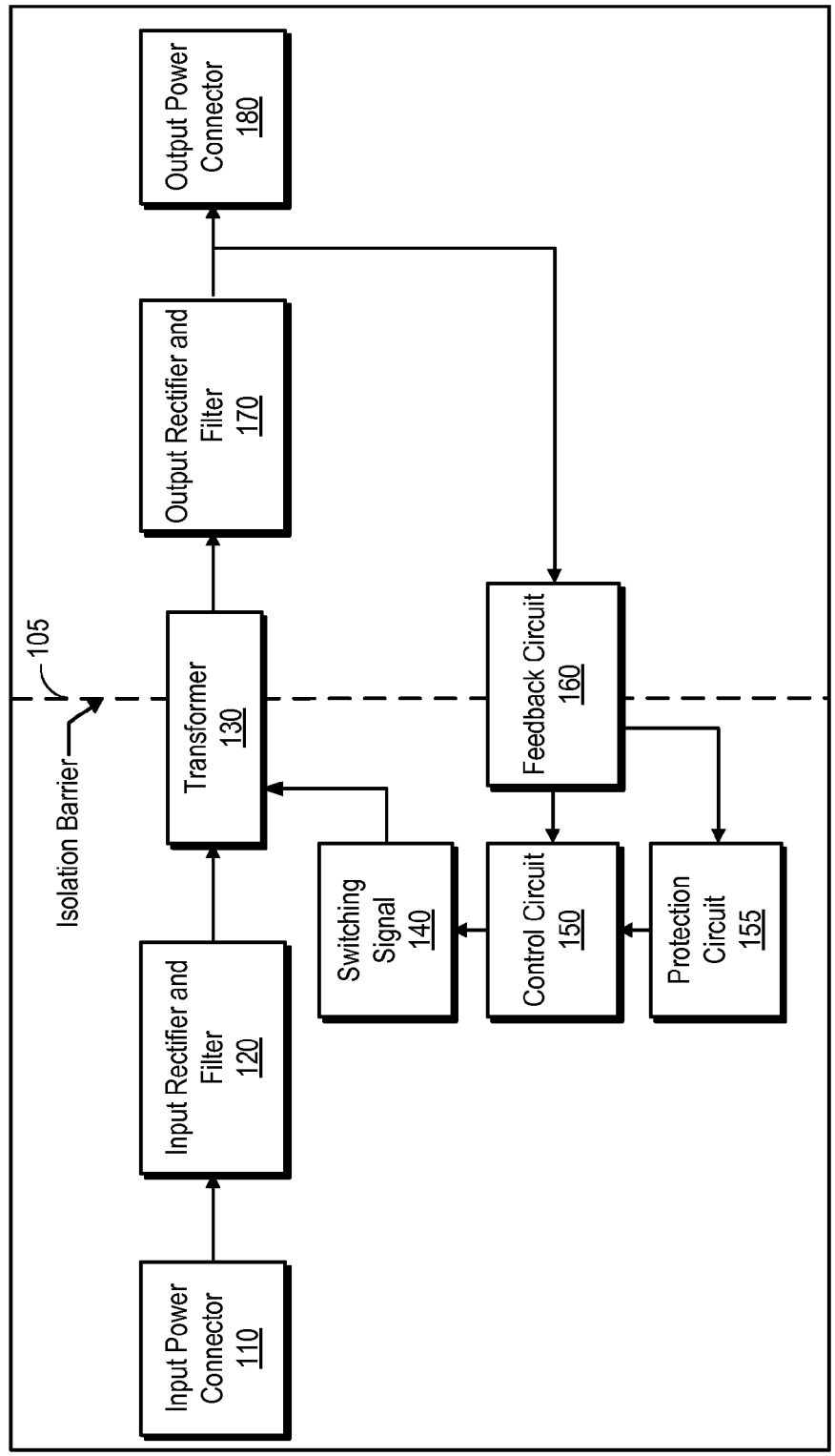
FIG. 1B illustrates an embodiment of a block diagram of a SMPS, including a feedback circuit, a control circuit, and a protection circuit configured to constrain the average output power of the SMPS.

FIG. 1B illustrates an embodiment of a block diagram of a SMPS 101, including a feedback circuit 160, a control circuit 150, and a protection circuit 155. Protection circuit 155 may be configured to constrain the average output power of SMPS 101. Protection circuit 155 may be configured to constrain the average output power of the SMPS 101 based on a limitation of an enclosure, an operating condition, a safety specification, a component specification, a design specification, and/or other power-limiting, voltage-limiting, current limiting, and/or temperature-limiting condition. For example, protection circuit 155 may be configured to constrain the average output power of SMPS 101 to prevent an internal component from overheating and/or failing. Additionally or alternatively, protection circuit 155 may be configured to constrain the average output power of SMPS 101 to prevent an external enclosure from overheating and causing damage and/or posing a safety hazard.

Protection circuit 155 may be configured to selectively inhibit control circuit 150 from generating switching signal 140. Protection circuit 155 may provide control circuit 150 a protection signal that alternates between an enable state and an inhibit state. The protection signal may oscillate at a relatively low frequency and/or may include an asymmetrical duty cycle. For example, control circuit 150 may generate a protection signal with a frequency between 0.5 Hertz and 10 Hertz. The protection signal may remain in an inhibit state for between about 51 and 99.99 percent of the time and in an enable state for the remainder of the time. In one embodiment, the protection signal has a 90/10 duty cycle, such that it remains in an inhibit state for 90 percent of the time and in an enable state for 10 percent of the time. In some embodiments, the protection signal may remain in an enable state for between about 51 and 99.99 percent of the time and in an inhibit state for the remainder of the time.

Protection circuit 155 may include a detection circuit configured to selectively force the protection signal to the enable state when the feedback signal indicates that less power is needed at the output. Any of a wide variety of configurations for protection circuit are possible. Accordingly, the specific examples of circuit configurations described herein are not intended to limit the scope thereof.

Figure 1C:
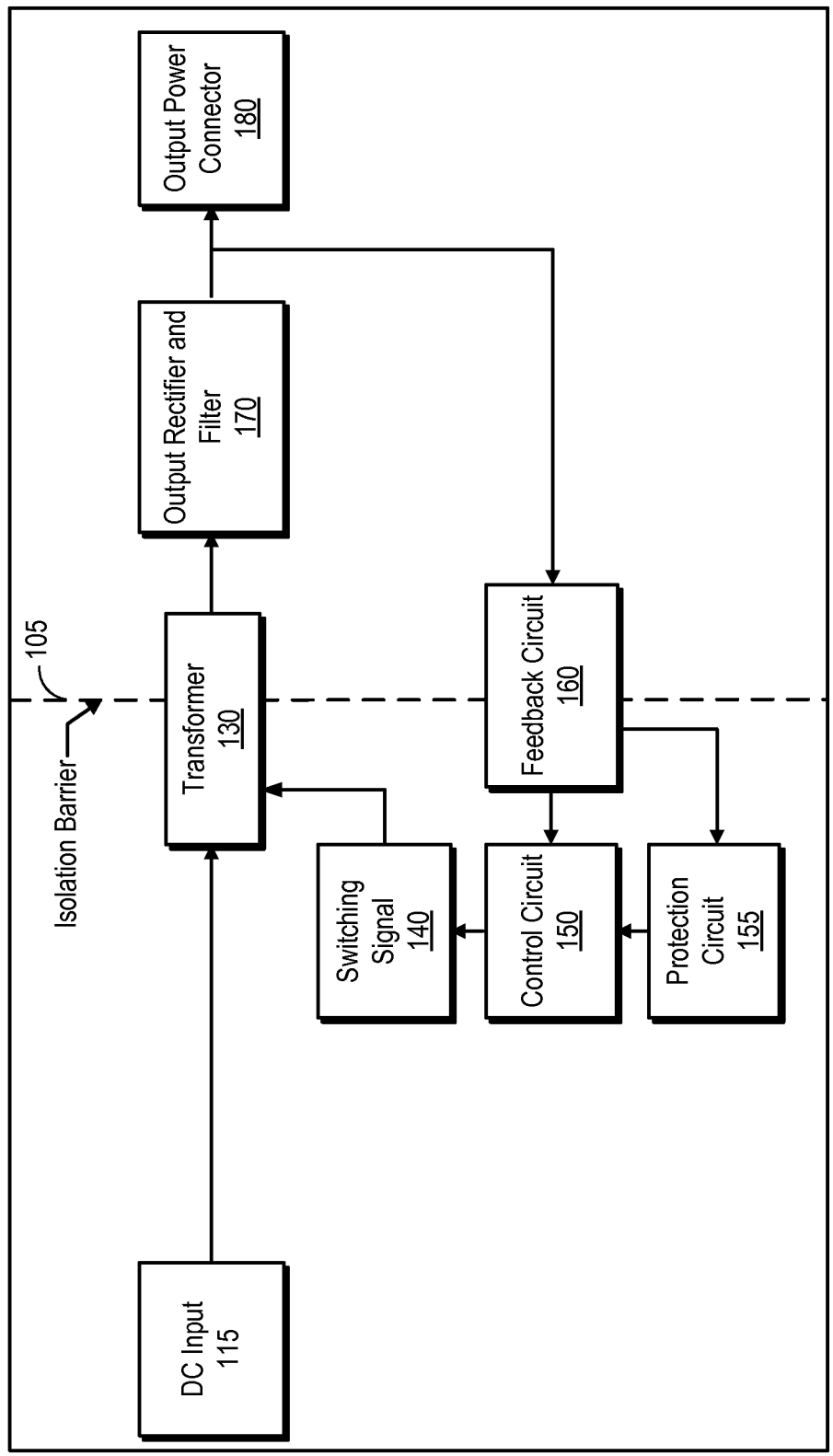
FIG. 1C illustrates an embodiment of a block diagram of a SMPS configured to convert a DC power signal from a first input voltage to at least one second DC output voltage.

FIG. 1C illustrates an embodiment of a block diagram of a SMPS 102 configured to convert a DC power signal 115 from a first input voltage to at least one second DC output voltage 180. Such a configuration may otherwise function similar to the embodiments described in conjunction with FIGS. 1A and 1B.

Figure 2A:
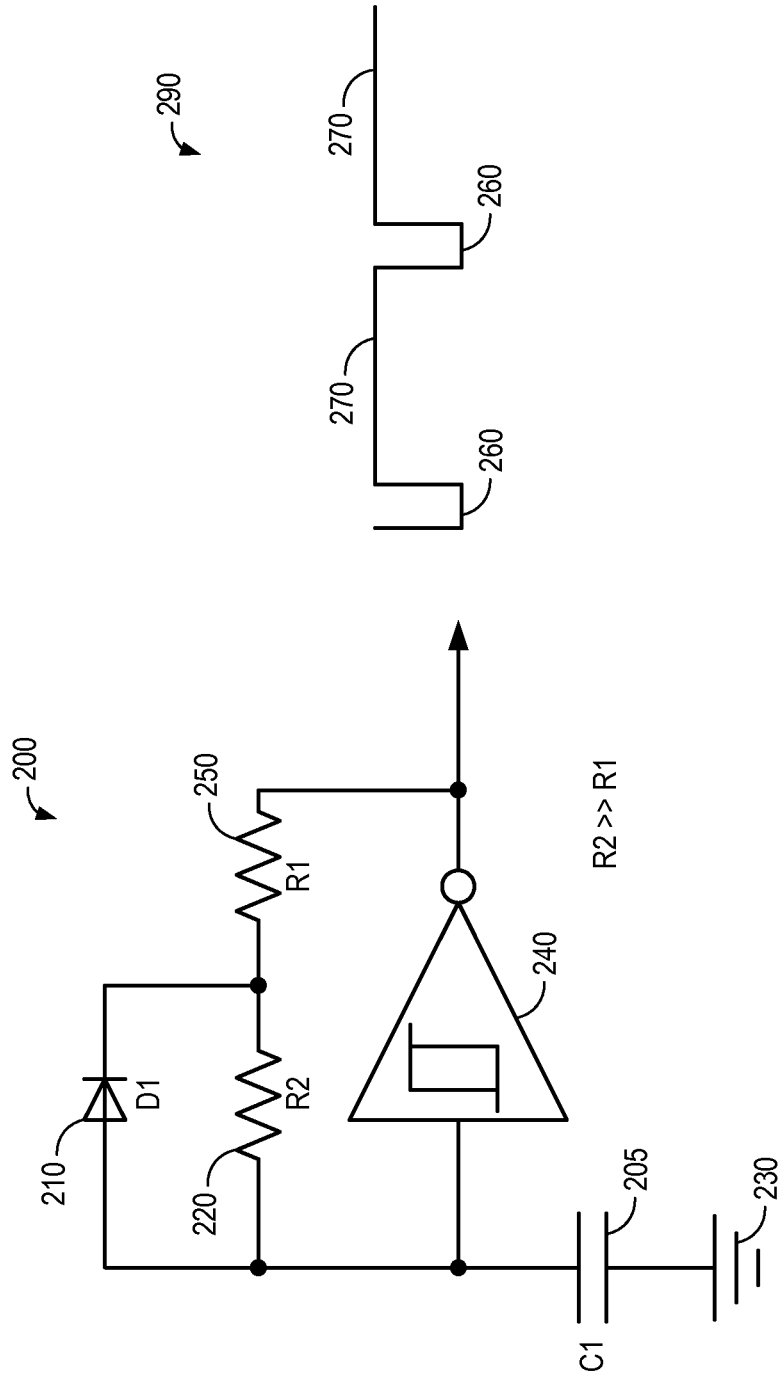
FIG. 2A illustrates one embodiment of a portion of a protection circuit including a square wave inverter and a feedback network.

FIG. 2A illustrates one embodiment of an oscillation circuit 200 of a protection circuit including a square wave inverter 240 and a feedback network comprising resistors 220 and 250, diode 210, and capacitor 205. Oscillation circuit 200 is configured to generate a protection signal 290. As illustrated, protection signal 290 may comprise an asymmetrical duty cycle with an enable state 260 and an inhibit state 270. As previously described, protection signal 290 may oscillate at a relatively low frequency, such as between approximately 0.5 Hertz and 100 Hertz. In some embodiments, a sine wave inverter may be used in place of square wave inverter 240.

As illustrated, the feedback network may comprise a first resistor 250 in series with a second resistor 220 connecting an output of square wave inverter 240 to an input of square wave inverter 240. A diode 210 may be in parallel with second resistor 220, with the cathode of diode 210 connected between first resistor 250 and second resistor 220, and the anode of diode 210 connected to the input of square wave inverter 240. Additionally, a capacitor 205 may connect the input of square wave inverter 240 to a ground terminal 230 (or other lower or negative voltage as would be understood by one of skill in the art).

In various embodiments, second resistor 220 may have a much greater resistance than first resistor 250. Accordingly, when the output of square wave inverter 240 is high (and the input of square wave inverter 240 is low), at 270, capacitor 205 will charge slowly through the relatively large combined resistance of first resistor 250 and second resistor 220. When capacitor 205 is sufficiently charged, the input of square wave inverter 240 will be high, driving the output of square wave inverter 240 low, at 260. With the input of square wave inverter 240 high (and the output of square wave inverter 240 low, at 260, capacitor 205 will discharge relatively rapidly through diode 210 and the relatively small first resistor 250. Accordingly, diode 210 allows capacitor 205 to discharge rapidly through first resistor 250 and causes capacitor 205 to charge relatively slowly through the relatively large combined resistance of first resistor 250 and second resistor 220.

The capacitance of capacitor 205, the resistance of first resistor 250 and second resistor 220, and the characteristics of diode 210 may be selected to obtain any of a wide variety of duty cycles and/or frequencies. As previously described, oscillation circuit 200 may be configured to oscillate at a frequency between approximately 0.5 Hertz and 100 Hertz and may remain in an inhibit state (high voltage in the illustrated example) between 51 and 99.99 percent of the time. In one embodiment, protection signal 290 may oscillate at about 1 Hertz and be configured to remain in an inhibit (high) state for approximately 900 milliseconds, and in an enable state for approximately 100 milliseconds. Reversing the direction of diode 210 may allow for an opposite duty cycle, in which the low voltage is held for approximately 900 milliseconds and the high voltage is held for approximately 100 milliseconds. In such an embodiment, the inhibit state may be the low voltage and the enable state may be the high voltage.

Figure 2B:
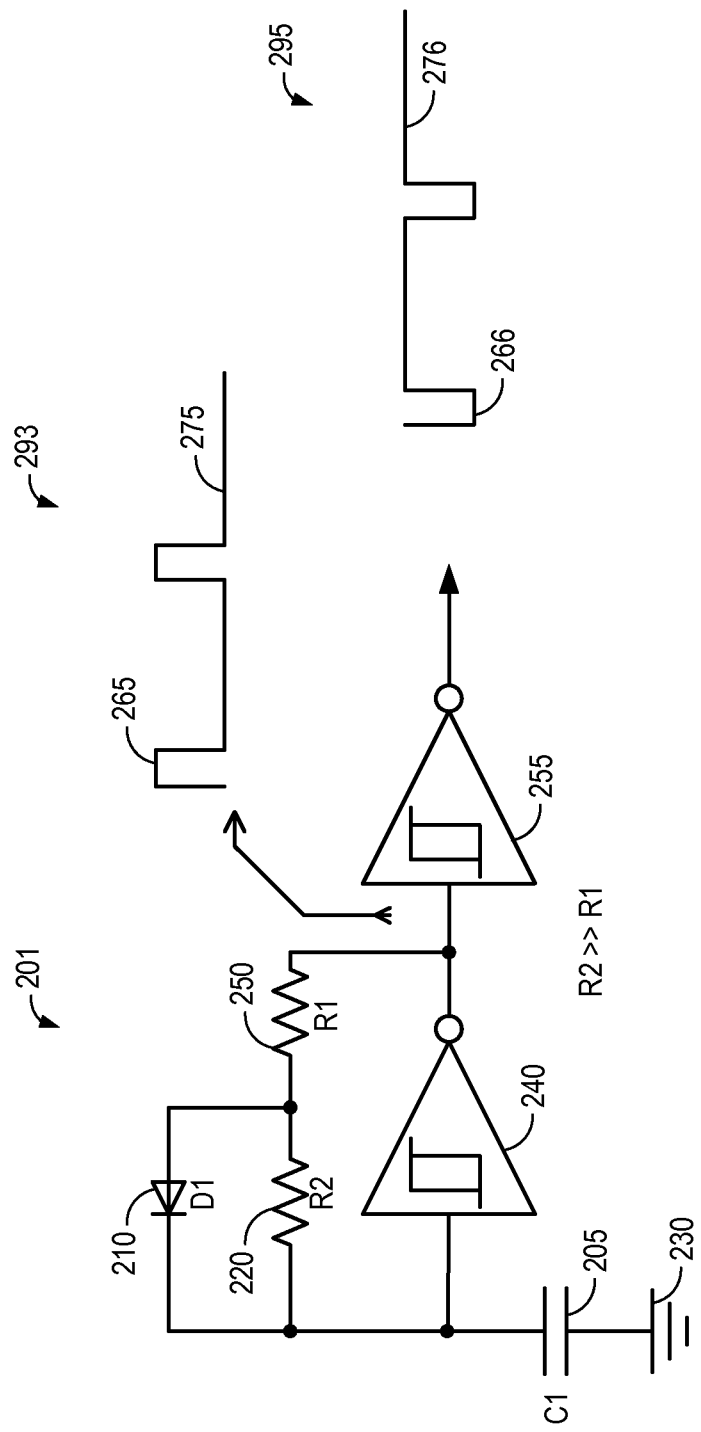
FIG. 2B illustrates an embodiment of a portion of a protection circuit including two square wave inverters and a feedback network.

FIG. 2B illustrates another embodiment of an oscillation circuit 201 of a protection circuit including a first square wave inverter 240 with a feedback network comprising resistors 220 and 250, diode 210, and capacitor 205. Oscillation circuit 201 differs from oscillation circuit 200 in FIG. 2A with the addition of a second square wave inverter 255 and that diode 210 is reversed. Oscillation circuit 201 is configured to generate an intermediate protection signal 293, which is inverted by second square wave inverter 255 to produce protection signal 295. Protection signal 295 may be configured with similar characteristics to those described in conjunction with protection signal 290. In some embodiments, a sine wave inverter may be used in place of first 240 and/or second 255 square wave inverter.

As illustrated, the feedback network of oscillation circuit 201 may be similar to that of the oscillation circuit 200 of FIG. 2A. Accordingly, the feedback network may include a first resistor 250 in series with a second resistor 220 connecting an output of first square wave inverter 240 to an input of first square wave inverter 240. A diode 210 may be in parallel with second resistor 220, with the anode of diode 210 connected between first resistor 250 and second resistor 220, and the cathode of diode 210 connected to the input of first square wave inverter 240. Additionally, a capacitor 205 may connect the input of first square wave inverter 240 to a ground terminal 230 (or other lower or negative voltage as would be understood by one of skill in the art).

In various embodiments, second resistor 220 may have a much greater resistance than first resistor 250. Accordingly, when the output of first square wave inverter 240 is high (and the input of square wave inverter 240 is low), at 265, capacitor 205 will charge relatively quickly through first resistor 250 and diode 210. When capacitor 205 is sufficiently charged, the input of first square wave inverter 240 will be high, driving the output of first square wave inverter 240 low, at 275. With the input of first square wave inverter 240 high (and the output of first square wave inverter low, at 275, capacitor 205 will discharge relatively slowly through the relatively large resistance of second resistor 220 and first resistor 250. Accordingly, in oscillation circuit 201, diode 210 allows capacitor 205 to charge rapidly through first resistor 250 and causes capacitor 205 to discharge relatively slowly through the relatively large combined resistance of first resistor 250 and second resistor 220. Second square wave inverter 255 inverts intermediate protection signal 293 to obtain protection signal 295.

Again, the capacitance of capacitor 205, the resistance of first resistor 250 and second resistor 220, and the characteristics of diode 210 may be selected to obtain any of a wide variety of duty cycles and/or frequencies. Oscillation circuit 201 may be configured to oscillate at a frequency between approximately 0.5 Hertz and 100 Hertz and may remain in an inhibit state (high voltage in the illustrated example) between approximately 51 and 99.99 percent of the time. In one embodiment, protection signal 295 may oscillate at about 1 Hertz and be configured to remain in an inhibit (high) state 276 for approximately 900 milliseconds, and in an enable state 266 for approximately 100 milliseconds. Reversing the direction of diode 210 may allow for an opposite duty cycle, in which the low voltage is held for approximately 900 milliseconds and the high voltage is held for approximately 100 milliseconds. In such an embodiment, the inhibit state may be the low voltage and the enable state may be the high voltage.

Figure 3A:
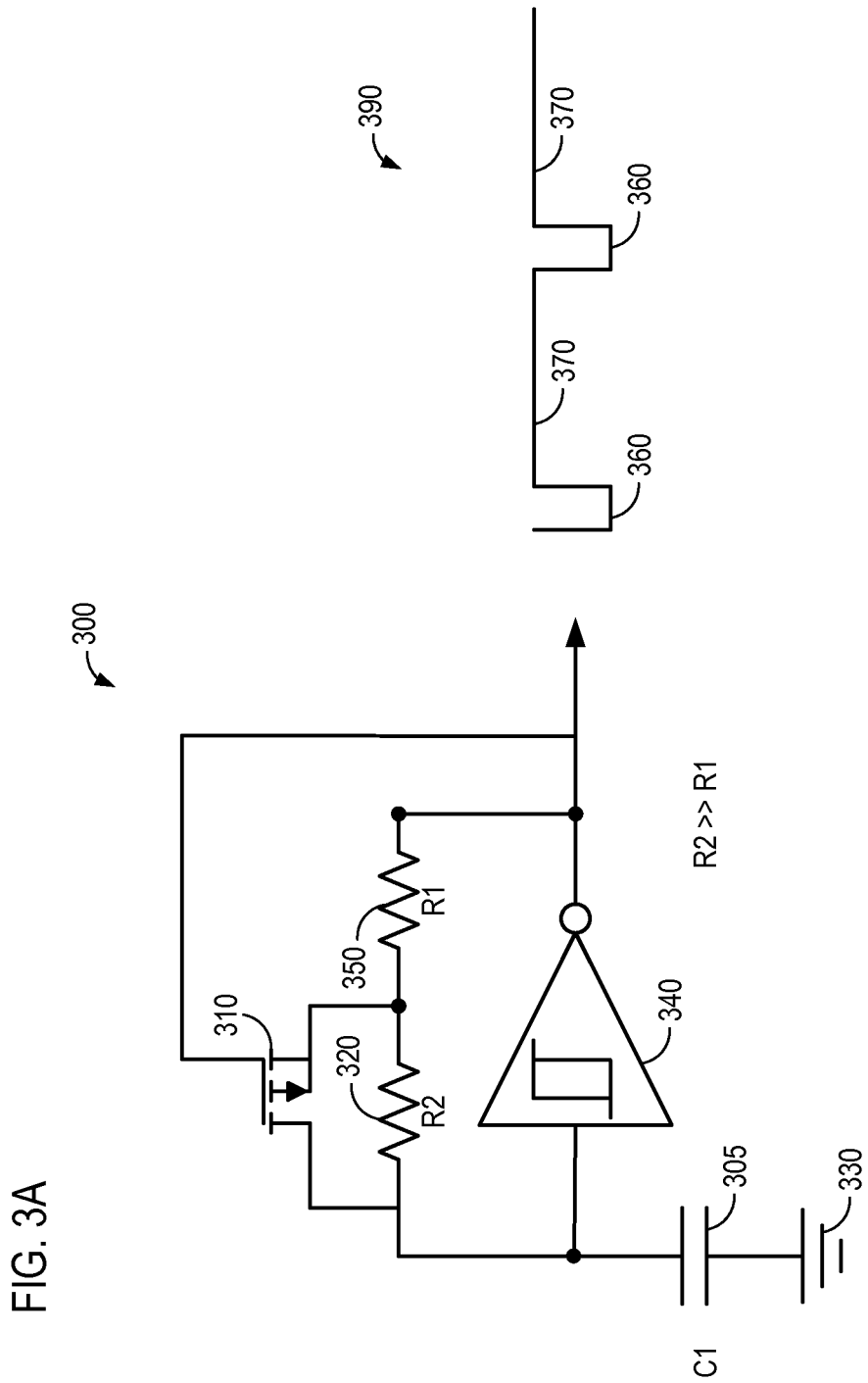
FIG. 3A illustrates an embodiment of a portion of a protection circuit including a square wave inverter and a feedback network that includes a metal-oxide-semiconductor field-effect transistor (MOSFET).

FIG. 3A illustrates an embodiment of an oscillation circuit 300 of a protection circuit similar to that illustrated in FIG. 2A, except that diode 210 of oscillation circuit 200 is replaced with a metal-oxide-semiconductor field-effect transistor (MOSFET) 310. Oscillation circuit 300 may include a square wave inverter 340 with a feedback network comprising resistors 320 and 350, MOSFET 310, and capacitor 305. Oscillation circuit 300 may be configured to generate a protection signal 390. As illustrated, protection signal 390 may comprise an asymmetrical duty cycle with an enable state 360 and an inhibit state 370. Protection signal 390 may oscillate at a relatively low frequency, such as between approximately 0.5 Hertz and 100 Hertz. In some embodiments, a sine wave inverter may be used in place of square wave inverter 340.

As illustrated, the feedback network may comprise a first resistor 350 in series with a second resistor 320 connecting an output of square wave inverter 340 to an input of square wave inverter 340. A (P-Channel) MOSFET 310 may be in parallel with second resistor 320, with the drain of MOSFET 310 connected to the input of square wave inverter 340, the source of MOSFET 310 connected between first 350 and second 320 resistors, and the gate of MOSFET connected to the output of square wave inverter 340. Additionally, a capacitor 305 may connect the input of square wave inverter 340 to a ground terminal 330 (or other lower or negative voltage as would be understood by one of skill in the art).

In various embodiments, second resistor 320 may have a much greater resistance than first resistor 350. Accordingly, when the output of square wave inverter 340 is high (and the input of square wave inverter 340 is low), at 370, the MOSFET 310 will be turned off, thereby function similar to an "ideal" diode with the cathode of the ideal diode connected between first resistor 350 and second resistor 320, and the anode of ideal diode 310 connected to the input of square wave inverter 340. With the MOSFET 310 off, it may also be considered similar to an open circuit. Accordingly, capacitor 305 will charge slowly through the relatively large combined resistance of first resistor 350 and second resistor 320.

When capacitor 305 is sufficiently charged, the input of square wave inverter 340 will be high, driving the output of square wave inverter low, at 360. This may cause the gate of MOSFET 310 to be negative relative to the source of MOSFET 310, since second resistor 320 has a much greater resistance than first resistor 350. Accordingly, with the input of square wave inverter 340 high (and the output of square wave inverter 340 low, at 360, capacitor 305 will discharge relatively rapidly through MOSFET 310 and the relatively small first resistor 350. Accordingly, MOSFET 310 allows capacitor 305 to discharge rapidly through first resistor 350 and causes capacitor 305 to charge relatively slowly through the relatively large combined resistance of first resistor 350 and second resistor 320.

The capacitance of capacitor 305, the resistance of first resistor 350 and second resistor 320, and the characteristics of MOSFET 310 may be selected to obtain any of a wide variety of duty cycles and/or frequencies. As previously described, oscillation circuit 300 may be configured to oscillate at a frequency between approximately 0.5 Hertz and 100 Hertz and may remain in an inhibit state 370 (high voltage in the illustrated example) between 51 and 99.99 percent of the time. In one embodiment, protection signal 390 may oscillate at about 1 Hertz and be configured to remain in an inhibit (high) state 370 for approximately 900 milliseconds, and in an enable state 360 for approximately 100 milliseconds.

Figure 3B:
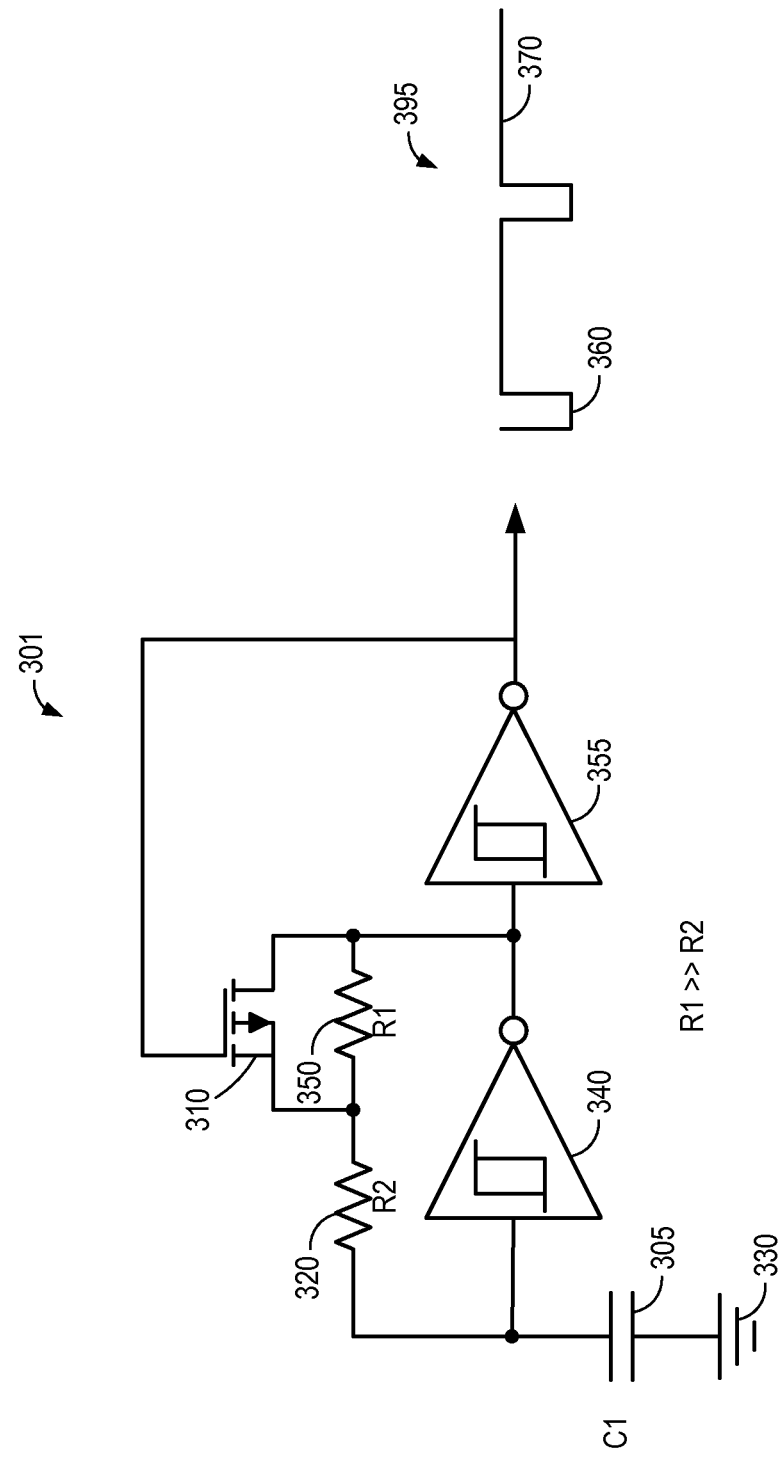
FIG. 3B illustrates an embodiment of a portion of a protection circuit including two square wave inverters and a feedback network that includes a MOSFET.

FIG. 3B illustrates another embodiment of an oscillation circuit 301 of a protection circuit including a first square wave inverter 340 and a second square wave inverter 355. First square wave inverter 340 may include a feedback network comprising resistors 320 and 350, MOSFET 310, and capacitor 305. First square wave inverter 340 may be configured to generate an intermediary protection signal, which may then be inverted by second square wave inverter 355 in order to generate protection signal 395. Protection signal 395 may comprise an asymmetrical duty cycle with an enable state 360 and an inhibit state 370. Protection signal 395 may oscillate at a relatively low frequency, such as between approximately 0.5 Hertz and 100 Hertz. In some embodiments, a sine wave inverter may be used in place of square wave inverters 340 and/or 355.

The feedback network of first square wave inverter 340 may comprise a first resistor 350 in series with a second resistor 320 connecting an output of first square wave inverter 340 to an input of first square wave inverter 340. A (P-Channel) MOSFET 310 may be in parallel with first resistor 350, with the drain of MOSFET 310 connected to the output of first square wave inverter 340, the source of MOSFET 310 connected between first 350 and second 320 resistors, and the gate of MOSFET 310 connected to the output of second square wave inverter 355. Additionally, a capacitor 305 may connect the input of square wave inverter 340 to a ground terminal 330 (or other lower or negative voltage as would be understood by one of skill in the art).

In various embodiments, first resistor 350 may have a much greater resistance than second resistor 320. Accordingly, when the output of second square wave inverter 355 is low and the output of first square wave inverter 340 is high, at 360, the MOSFET 310 will be turned on, allowing the high output of first square wave inverter 340 to rapidly charge capacitor 305 through MOSFET 310 and the relatively small resistance of second resistor 320. When capacitor 305 is sufficiently charged, the input of first square wave inverter 340 will be high, driving the output of second square wave inverter 355 high as well. MOSFET 310 will turn off since the gate of MOSFET 310 is connected to the output of second square wave inverter 355. With MOSFET 310 turned off, it will act as an open circuit. Accordingly, capacitor 305 will discharge slowly through the relative large combined resistance of second resistor 320 and first resistor 350.

Accordingly, MOSFET 310 of oscillation circuit 301 allows capacitor 305 to charge rapidly through second resistor 320 and causes capacitor 305 to discharge relatively slowly through the relatively large combined resistance of second resistor 320 and first resistor 350.

The capacitance of capacitor 305, the resistances of first resistor 350 and second resistor 320, and the characteristics of MOSFET 310 may be selected to obtain any of a wide variety of duty cycles and/or frequencies. As previously described, oscillation circuit 301 may be configured to oscillate at a frequency between approximately 0.5 Hertz and 100 Hertz and may remain in an inhibit state 370 (high voltage in the illustrated example) between 51 and 99.99 percent of the time. In one embodiment, protection signal 395 may oscillate at about 1 Hertz and be configured to remain in an inhibit (high) state 370 for approximately 900 milliseconds, and in an enable state 360 for approximately 100 milliseconds.

Figure 4A:
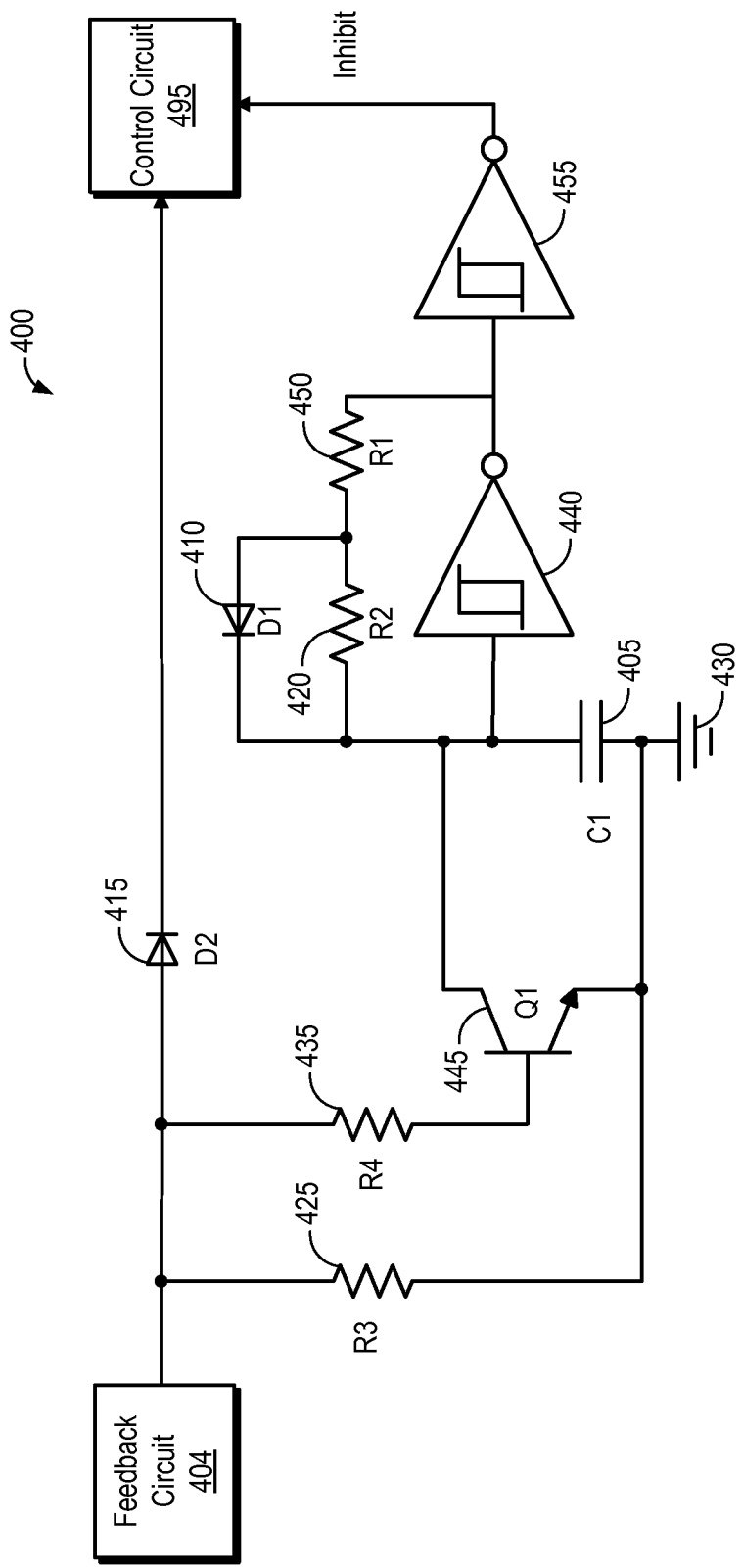
FIG. 4A illustrates an embodiment of a protection circuit including a detection circuit and an oscillation circuit configured with a feedback network.

FIG. 4A illustrates an embodiment of a protection circuit 400 including a detection circuit and an oscillation circuit. A feedback circuit 404 may be configured to generate a feedback signal associated with an output of a SMPS. In one embodiment, the feedback signal may be "high" when the output is too high and the feedback signal may be "low" when the output is too "low." Feedback circuit 404 may provide the feedback signal to control circuit 495 via a diode 415. Diode 415 may prevent any power from traveling in the reverse direction. As previously described, control circuit 495 may modify the frequency and/or duty cycle of a switching signal in a SMPS to adjust (increase or decrease) a DC output.

In the following examples, the feedback signal is assumed to be "high" when the voltage generated by the SMPS is too high. Similarly, protection circuit 400 may be configured such that the protection signal is "high" when in an inhibit state (inhibiting control circuit 495 from generating a switching signal) and "low" when in an enable state (allowing control circuit 495 to generate a switching signal based on the feedback signal provided by feedback circuit 404). As may be appreciated by one of skill in the art, in an alternative configuration, the "high" and "low" may be switched for the feedback signal and/or the protection signal.

In the illustrated embodiment, an oscillation circuit is configured as described in conjunction with FIG. 2B above. Specifically, a first square wave inverter 440 with a feedback network comprising resistors 420 and 450, diode 410, and capacitor 405 may generate an intermediate protection signal. The intermediate protection signal may be inverted by second square wave inverter 455 to generate a protection signal which may be provided to control circuit 495. The protection signal may have characteristics similar to those described in conjunction with other embodiments. As in other embodiments, a sine wave inverter may be used in place of first 440 and/or second 455 square wave inverter.

The feedback network may include a first resistor 450 in series with a second resistor 420 connecting an output of first square wave inverter 440 to an input of first square wave inverter 440. A diode 410 may be in parallel with second resistor 420, with the anode of diode 410 connected between first resistor 450 and second resistor 420, and the cathode of diode 410 connected to the input of first square wave inverter 440. Additionally, a capacitor 405 may connect the input of first square wave inverter 440 to a ground terminal 430 (or other lower or negative voltage as would be understood by one of skill in the art).

In various embodiments, second resistor 420 may have a much greater resistance than first resistor 450. Accordingly, when the output of first square wave inverter 440 is high (and the input of first square wave inverter 440 is low), capacitor 405 will charge relatively quickly through first resistor 450 and diode 410. When capacitor 405 is sufficiently charged, the input of first square wave inverter 440 will be high, driving the output of first square wave inverter 440 low. With the input of first square wave inverter 440 high (and the output of first square wave inverter 440 low, capacitor 405 will discharge relatively slowly through the relatively large resistance of second resistor 420 and first resistor 450. Second square wave inverter 455 inverts the output of first square wave inverter 440 and provides the protection signal to control circuit 495.

The capacitance of capacitor 405, the resistances of first resistor 450 and second resistor 420, and the characteristics of diode 410 may be selected to obtain any of a wide variety of duty cycles and/or frequencies, as described herein in conjunction with other embodiments. A bipolar junction transistor (BJT) 445 may function as a detection circuit. If the feedback signal is high, indicating that the output voltage of the SMPS is too high, BJT 445 will pull the input of first square wave inverter 440 low, forcing the protection signal provided to control circuit 495 to an enable state. Resistor 435 may limit the amount of current flowing from feedback circuit 404 to ground 430 through BJT 445. Resistor 425 may be relatively large and provide stability while allowing for a limited amount of current to flow from feedback circuit 404 to ground 430.

Protection circuit 400 may be configured to constrain the average output power of the SMPS in high-demand scenarios. For example, if 404 generates a "low" signal, indicating that more power is needed, control circuit 495 may normally drive the SMPS into overload and/or overheating conditions. In a high-demand scenario, BJT 445 will be turned off and function as an open circuit. Accordingly, a protection signal will be generated with an asymmetrical duty cycle at a relatively low frequency. The protection signal may have a duty cycle alternating between an inhibit state and an enable state, so as to limit the average output power of the SMPS to within predefined limits. For example, the protection cycle may inhibit control circuit 495 for 900 milliseconds to cool down components, and then enable control circuit 495 for 100 milliseconds to allow for DC output generation. The duty cycles and/or frequencies may be adapted for a specific configuration.

Figure 4B:
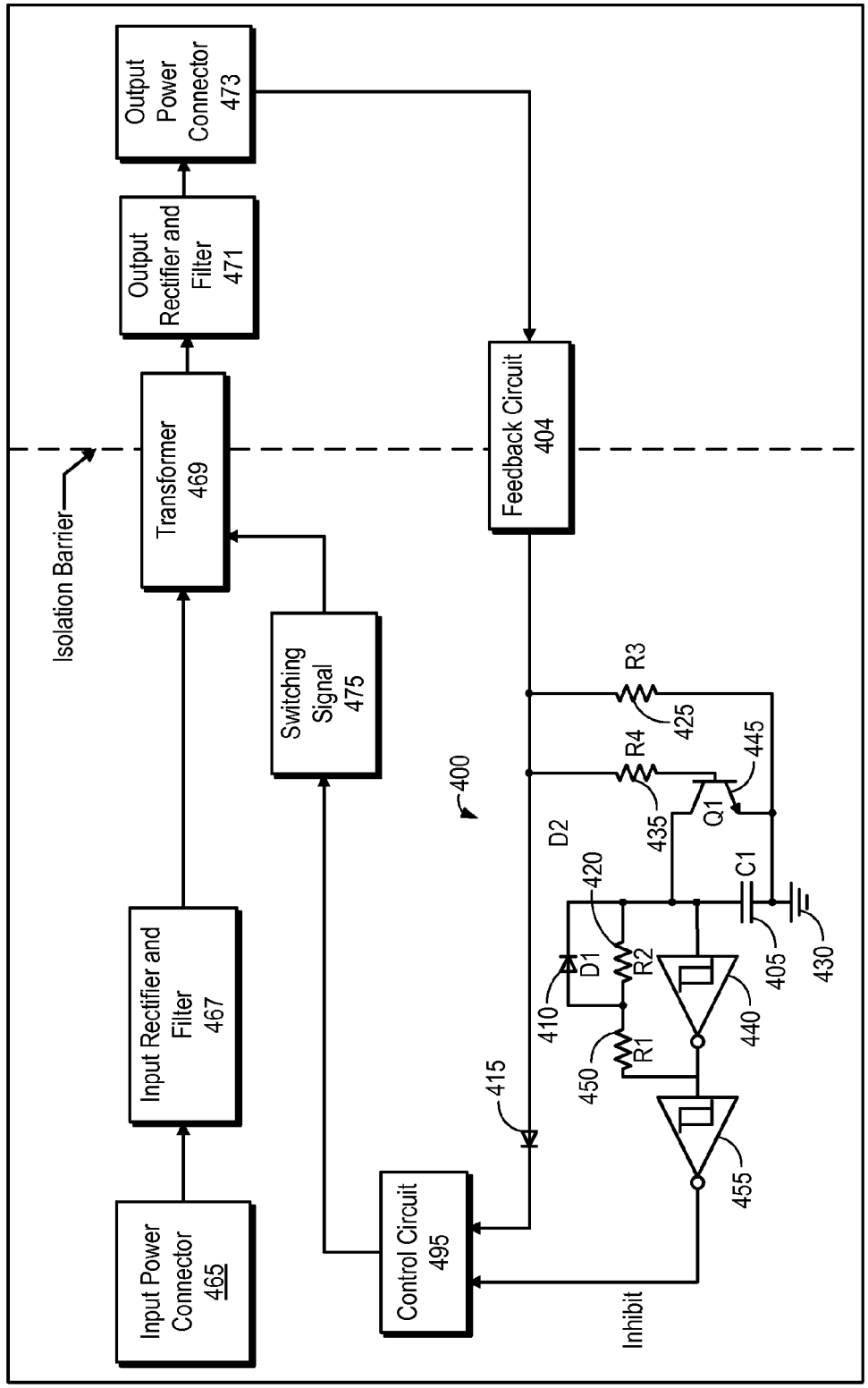
FIG. 4B illustrates an embodiment of a block diagram of a SMPS, including a component view of the protection circuit illustrated in FIG. 4A.

FIG. 4B illustrates an embodiment of a block diagram of a SMPS 460, including a component view protection circuit 400. SMPS 460 may include an input power connector 465 configured to receive an alternating current (AC) power signal, such as a 110/120 Volt AC or 220/240 Volt AC signal. SMPS 460 may include an IRF 467 configured to rectify and/or filter the AC power signal to a DC power signal.

SMPS 460 may be configured to switch the DC power signal between two or more states (such as on and off or positive and negative) across a primary winding(s) of a power transformer 469. A switching signal 475, generated by a control circuit 495, may control the frequency at which the DC power signal is switched across the primary winding(s) of power transformer 469. Control circuit 495 may modify the frequency and/or duty cycle of switching signal 475 in order to adjust (increase or decrease) the voltage and/or current output by SMPS 460.

Feedback circuit 404 may provide a feedback signal to control circuit 495, the feedback signal associated with the DC output of SMPS 460. Control circuit 495 may selectively generate switching signal 475 based on the feedback signal and the protection signal generated by protection circuit 400. Switching signal 475 may switch the DC output of the IRF (or the originally input DC power signal) across a primary winding of power transformer 469, in order to selectively induce a current in the secondary winding of power transformer 469. Accordingly, control circuit 495 may adjust switching signal 475 based on the feedback signal in order to increase or decrease the DC output of SMPS 460.

Additionally, SMPS 460 may include an ORF 471 configured to rectify the AC current on the secondary winding(s) to generate one or more DC outputs at one or more desired voltages. The DC output(s) may be provided to one or more devices via one or more output power connectors 473. As previously described, feedback circuit 404 may generate a feedback signal associated with the DC output and provide it to control circuit 495. Control circuit 495 may use the feedback signal to modify the frequency and/or duty cycle of switching signal 475 to increase or decrease the voltage and/or current of the DC output of SMPS 460.

As described in conjunction with FIG. 4A, protection circuit 400 may be configured to constrain the average output power of SMPS 460. Protection circuit 400 may be configured to constrain the average output power of the SMPS 460 based on a limitation of an enclosure, an operating condition, a safety specification, a component specification, a design specification, and/or other power-limiting, voltage-limiting, current limiting, and/or temperature limiting condition. For example, protection circuit 400 may be configured to constrain the average output power of SMPS 460 to prevent an internal component from overheating and/or failing. Additionally or alternatively, protection circuit 400 may be configured to constrain the average output power of SMPS 460 to prevent an external enclosure from overheating and causing damage and/or posing a safety hazard.

Protection circuit 400 may be configured to selectively inhibit control circuit 495 from generating switching signal 475. Protection circuit 400 may provide control circuit 495 a protection signal that alternates between an enable state and an inhibit state. The protection signal may oscillate at a relatively low frequency and/or may include an asymmetrical duty cycle. For example, control circuit 495 may generate a protection signal with a frequency between 0.5 Hertz and 10 Hertz. The protection signal may remain in an inhibit state for between about 51 and 99.99 percent of the time and in an enable state for the remainder of the time. In one embodiment, the protection signal has a 90/10 duty cycle, such that it remains in an inhibit state for 90 percent of the time and in an enable state for 10 percent of the time.

Figure 5A:
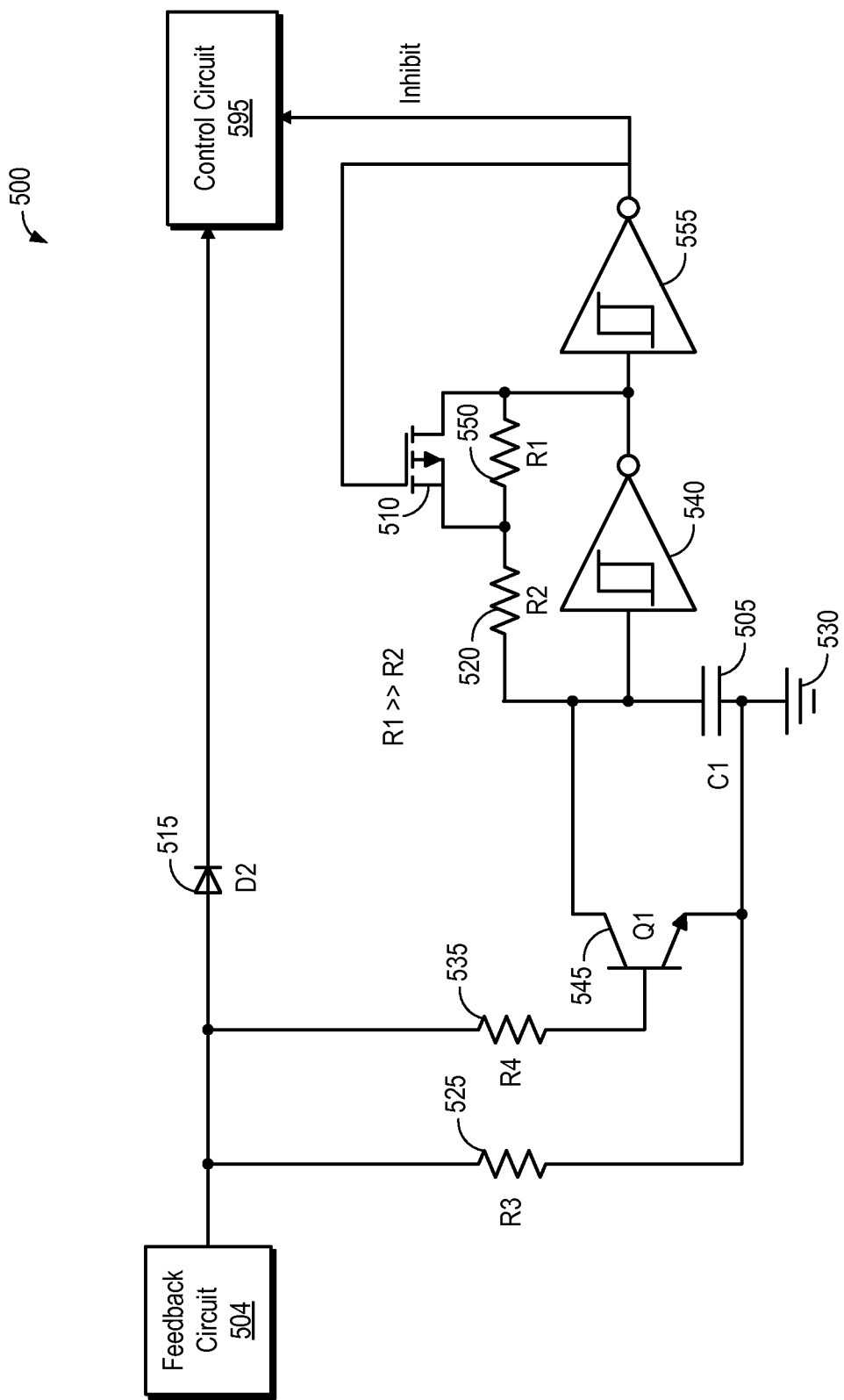
FIG. 5A illustrates an alternative embodiment of a protection circuit including a detection circuit and an oscillation circuit configured with a MOSFET in a feedback network.

FIG. 5A illustrates another embodiment of a protection circuit 500 including a detection circuit and an oscillation circuit configured with a MOSFET 510 in a feedback network. A feedback circuit 504 may be configured to generate a feedback signal associated with an output of a SMPS. In one embodiment, the feedback signal may be "high" when the output is too high and the feedback signal may be "low" when the output is too "low." Feedback circuit 504 may provide the feedback signal to control circuit 595 via a diode 515. Diode 515 may prevent any power from traveling from control circuit 595 to feedback circuit 504. Control circuit 595 may modify the frequency and/or duty cycle of a switching signal in a SMPS to adjust (increase or decrease) a DC output of the SMPS.

In the following examples, the feedback signal is assumed to be "high" when the output voltage of the SMPS is too high. Similarly, protection circuit 500 may be configured such that the protection signal is "high" when in an inhibit state (inhibiting control circuit 595 from generating a switching signal) and "low" when in an enable state (allowing control circuit 595 to generate a switching signal based on the feedback signal provided by feedback circuit 504). As may be appreciated by one of skill in the art, in an alternative configuration, the "high" and "low" may be switched for the feedback signal and/or the protection signal.

In the illustrated embodiment, an oscillation circuit is configured as described in conjunction with FIG. 3B above. Specifically, a first square wave inverter 540 may include a feedback network comprising resistors 520 and 550, MOSFET 510, and capacitor 505. First square wave inverter 540 may be configured to generate an intermediary protection signal, which may then be inverted by second square wave inverter 555 in order to generate a protection signal. The protection signal may then be provided to control circuit 595. The protection signal may have an asymmetrical duty cycle and oscillate between an enable state and an inhibit state. The protection signal may oscillate at a relatively low frequency, such as between approximately 0.5 Hertz and 100 Hertz. In some embodiments, a sine wave inverter may be used in place of square wave inverters 540 and/or 555.

The feedback network of first square wave inverter 540 may comprise a first resistor 550 in series with a second resistor 520 connecting an output of first square wave inverter 540 to an input of first square wave inverter 540. A (P-Channel) MOSFET 510 may be in parallel with first resistor 550, with the drain of MOSFET 510 connected to the output of first square wave inverter 540, the source of MOSFET 510 connected between first 550 and second 520 resistors, and the gate of MOSFET 510 connected to the output of second square wave inverter 555. Additionally, a capacitor 505 may connect the input of square wave inverter 540 to a ground terminal 530 (or other lower or negative voltage as would be understood by one of skill in the art).

First resistor 550 may have a much greater resistance than second resistor 520. Accordingly, when the output of second square wave inverter 555 is low and the output of first square wave inverter 540 is high, the MOSFET 510 will be turned on, allowing the high output of first square wave inverter 540 to rapidly charge capacitor 505 through MOSFET 510 and the relatively small resistance of second resistor 520. When capacitor 505 is sufficiently charged, the input of first square wave inverter 540 will be high, driving the output of second square wave inverter 555 high as well. MOSFET 510 will turn off since the gate of MOSFET 510 is connected to the output of second square wave inverter 555. With MOSFET 510 turned off, it will act as an open circuit. Accordingly, capacitor 505 will discharge slowly through the relative large combined resistance of second resistor 520 and first resistor 550.

The capacitance of capacitor 505, the resistances of first resistor 550 and second resistor 520, and the characteristics of MOSFET 510 may be selected to obtain any of a wide variety of duty cycles and/or frequencies. A bipolar junction transistor (BJT) 545 may function as a detection circuit. If the feedback signal is high, indicating that too much power is being output by the SMPS, BJT 545 will pull the input of first square wave inverter 540 low, forcing the protection signal provided to control circuit 595 to an enable state. Resistor 535 may limit the amount of current flowing from feedback circuit 504 to ground 530 through BJT 545. Resistor 525 may be relatively large and provide stability while allowing for a limited amount of current to flow from feedback circuit 504 to ground 530.

Protection circuit 500 may be configured to constrain the average output power of the SMPS in high-demand scenarios. For example, if feedback circuit 504 generates a "low" signal, indicating that more power is needed, control circuit 595 may normally drive the SMPS into overload and/or overheating conditions. In a high-demand scenario, BJT 545 will be turned off and function as an open circuit. Accordingly, a protection signal will be generated with an asymmetrical duty cycle at a relatively low frequency. The protection signal may have a duty cycle alternating between an inhibit state and an enable state, so as to limit the average output power of the SMPS to within predefined limits. For example, the protection cycle may inhibit control circuit 595 for 900 milliseconds to cool down components, and then enable control circuit 595 for 100 milliseconds to allow for DC output generation. The duty cycles and/or frequencies may be adapted for a specific configuration.

Figure 5B:
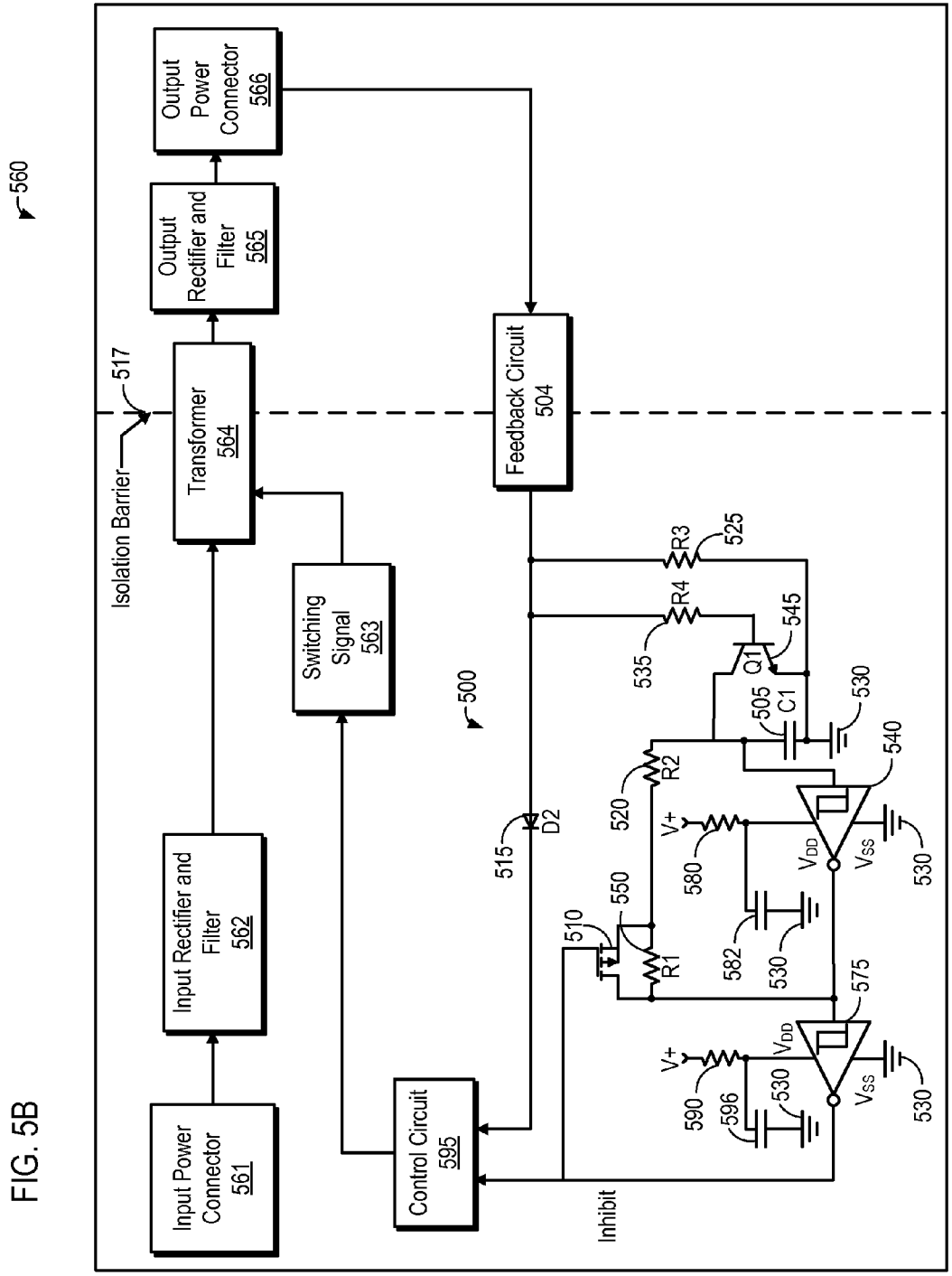
FIG. 5B illustrates an embodiment of a block diagram of a SMPS, including a component view of the protection circuit illustrated in FIG. 5A.

FIG. 5B illustrates an embodiment of a block diagram of a SMPS 560, including a component view protection circuit 500. SMPS 560 may include an input power connector 561 configured to receive an alternating current (AC) power signal, such as a 110/120 Volt AC or 220/240 Volt AC signal. SMPS 560 may include an IRF 562 configured to rectify and/or filter the AC power signal to a DC power signal.

SMPS 560 may be configured to switch the DC power signal between two or more states (such as on and off or positive and negative) across a primary winding(s) of a power transformer 564. A switching signal 563, generated by a control circuit 595, may control the frequency at which the DC power signal is switched across the primary winding(s) of power transformer 564. Control circuit 595 may modify the frequency and/or duty cycle of switching signal 563 in order to adjust (increase or decrease) the voltage and/or current output by SMPS 560.

Feedback circuit 504 may provide a feedback signal to control circuit 595, the feedback signal associated with the DC output of SMPS 560. Control circuit 595 may selectively generate switching signal 563 based on the feedback signal and the protections signal generated by protection circuit 500. Switching signal 563 may switch the DC output of the IRF (or the originally input DC power signal) across a primary winding of power transformer 564, in order to selectively induce a current in the secondary winding of power transformer 564. Accordingly, control circuit 595 may adjust switching signal 563 based on the feedback signal in order to increase or decrease the DC output of SMPS 560.

Additionally, SMPS 560 may include an ORF 565 configured to rectify the AC current on the secondary winding(s) to generate one or more DC outputs at one or more desired voltages. The DC output(s) may be provided to one or more devices via one or more output power connectors 566. As previously described, feedback circuit 504 may generate a feedback signal associated with the DC output and provide it to control circuit 595. Control circuit 595 may use the feedback signal to modify the frequency and/or duty cycle of switching signal 563 to increase or decrease the voltage and/or current of the DC output of SMPS 560.

As described in conjunction with FIG. 5A, protection circuit 500 may be configured to constrain the average output power of SMPS 560. Protection circuit 500 may be configured to constrain the average output power of the SMPS 560 based on a limitation of an enclosure, an operating condition, a safety specification, a component specification, a design specification, and/or other power-limiting, voltage-limiting, current limiting, and/or temperature limiting condition. For example, protection circuit 500 may be configured to constrain the average output power of SMPS 560 to prevent an internal component from overheating and/or failing. Additionally or alternatively, protection circuit 500 may be configured to constrain the average output power of SMPS 560 to prevent an external enclosure from overheating and causing damage and/or posing a safety hazard.

Protection circuit 500 may be configured to selectively inhibit control circuit 595 from generating switching signal 563. Protection circuit 500 may provide control circuit 595 a protection signal that alternates between an enable state and an inhibit state. The protection signal may oscillate at a relatively low frequency and/or may include an asymmetrical duty cycle. For example, control circuit 595 may generate a protection signal with a frequency between 0.5 Hertz and 10 Hertz. The protection signal may remain in an inhibit state for between about 51 and 99.99 percent of the time and in an enable state for the remainder of the time. In one embodiment, the protection signal has a 90/10 duty cycle, such that it remains in an inhibit state for 90 percent of the time and in an enable state for 10 percent of the time.

In addition, FIG. 5B illustrates portions circuits for providing power to the power rails of first square wave inverter 540 and second square wave inverter 575. First square wave inverter 540 and second square wave inverter 575 may be connected to ground 530 on one power rail (VSS), and connected to a power source V+ on the other power rail (VDD) in any of a wide variety of configurations known in the art.

In some embodiments, a startup power source for SMPS 560 may not provide sufficient power to allow SMPS 560 to initialize while first and second square wave inverters 540 and 575 are oscillating. Accordingly, first square wave inverter 540 and second square wave inverter 575 may be connected to V+ via resistors 580 and 590, respectively. Resistors 580 and 590 may be configured to limit the amount of current drawn by first and second square wave inverters 540 and 575. Capacitors 582 and 596 may be configured to provide instantaneous current to first square wave inverter 540 and second square wave inverter 575, respectively. Depending on the circuitry used to provide power during initialization, resistors 580 and 590 and/or capacitors 582 and 596 may be omitted.

In some embodiments, V+ may comprise a third power rail, an output of IRF 562, and/or an output of ORF 565. In any case, isolation barrier 517 may maintain the input side of SMPS 560 electrically isolated from the output side of SMPS 560, as may be understood by one of skill in the art. Resistors may be configured to limit and/or control the voltage and/or current provided by V+. Capacitors may be configured to provide instantaneous current draw, and diodes, such as a Zener diode, may be used to "clamp" the voltage to within desired ranges.

Figure 6:
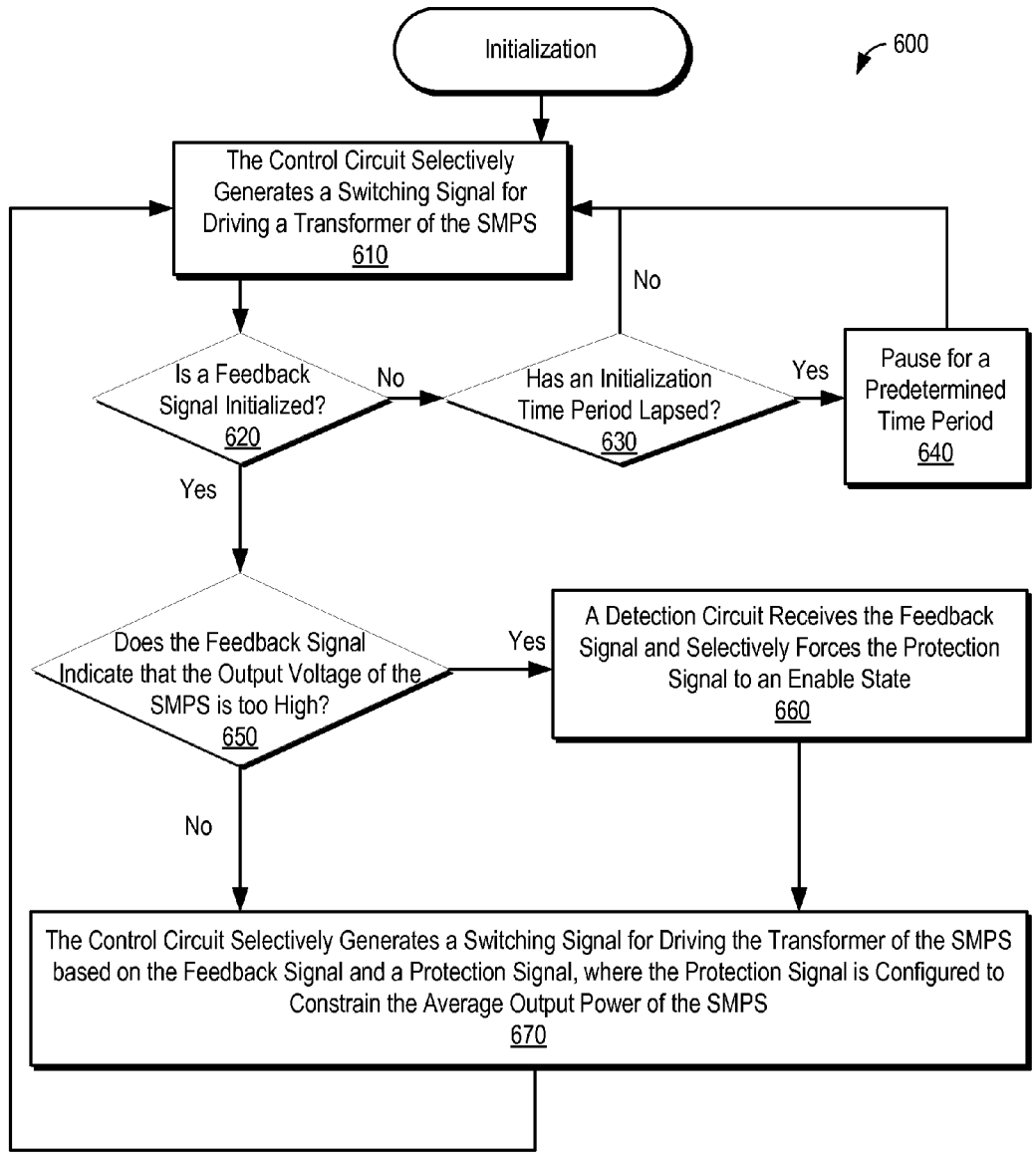
FIG. 6 illustrates a flow chart of an embodiment of a method for protecting a SMPS using a protection circuit as described herein.

FIG. 6 illustrates a flow chart of an embodiment of a method 600 for protecting a SMPS via a protection circuit as described herein. During an initialization period, the control circuit selectively generates a switching signal for driving a transformer of the SMPS, at 610. If the feedback signal has not been initialized, at 620, and the initialization period has not lapsed, at 630, then the control circuit may continue to generate a switching signal to drive the transformer of the SMPS, at 610. If the feedback signal does not initialize, at 620, and the initialization time period has lapsed, at 630, then the SMPS may rest for a predetermine time period, at 640. Accordingly, by traversing steps 610-640, the SMPS may periodically attempt to initialize the feedback signal and begin generating power. In order to prevent overheating, damaging circuit components, and/or wasting power, the SMPS may rest, at 640, at periodic intervals.

Once the feedback signal is initialized, at 620, the feedback signal may indicate that the output voltage of the SMPS is too high, at 650. In response to the feedback signal, a detection circuit may selectively force a protection signal to an enable state, at 660. If the feedback signal does not indicate that the output voltage of the SMPS is too high, at 650, the protection signal may oscillate between enable and inhibit states, as described in detail herein. The control circuit may then selectively generate a switching signal for driving the transformer of the SMPS based on the feedback signal and the protection signal, at 670. The process may repeat at 610. Each of the steps 610-670 may be performed in hardware, as described herein in conjunction with FIGS. 1-5B. It will be appreciated that the steps 610-670 need not be performed in any specific order, or even serially. That is, components may be configured to perform one or more of steps 610-670 in tandem, simultaneously, and/or constantly. In some embodiments, the steps 610-670 may be performed in any order or in parallel in order for various components to reach the results described by the text of steps 610-670.

As described herein, the protection signal may constrain the average output power of the SMPS. Accordingly, in some instances, the feedback signal may indicate that more power is needed, but the protection signal may inhibit the production of more power in order to prevent overheating, circuit component failure, and/or other issues. The protection circuit may comprise any of the various embodiments described herein. For example, the protection circuit may comprise an oscillation circuit configured to generate a protection signal with an asymmetric duty cycle oscillating between an enable state and an inhibit state. The protection circuit may then provide the protection signal to the control circuit to inhibit the control circuit from generating the switching signal when the protection signal is in the inhibit state.

The above description provides numerous specific details for a thorough understanding of the embodiments described herein. However, those of skill in the art will recognize that one or more of the specific details may be omitted, modified, and/or replaced by a similar process or system.

What is claimed:

1. A switch mode power supply, comprising:
   a feedback circuit configured to output a feedback signal associated with an output power of the switch mode power supply;
   a control circuit configured to receive the feedback signal and selectively generate a switching signal for driving a transformer in the switched mode power supply based on the feedback signal and a state of a protection signal; and
   a protection circuit configured to constrain an average power output of the switch mode power supply, the protection circuit comprising:
   an oscillation circuit comprising a feedback network, configured to:
   generate a protection signal with an asymmetric duty cycle oscillating between an enable state and an inhibit state; and
   provide the protection signal to the control circuit to inhibit the control circuit from generating the switching signal when the protection signal is in the inhibit state;
   wherein the feedback network comprises:
   a first resistor;
   a second resistor in series with the first resistor,
   a first wave inverter in parallel with the first resistor;
   a diode in parallel with the first resistor and the first wave inverter, such that a cathode of the diode is connected between the first resistor and the second resistor; and,
   a capacitor connected between the input of the first wave inverter and a ground terminal; and
   a detection circuit configured to receive the feedback signal and selectively force the protection signal to the enable state when the feedback signal indicates that an output voltage is too high.

2. The switch mode power supply of claim 1, wherein the switching signal is at a higher frequency than a frequency of the protection signal.

3. The switch mode power supply of claim 1, wherein the detection circuit comprises a transistor configured to selectively force the protection signal to the enable state.

4. The switch mode power supply of claim 1, wherein the first wave inverter comprises a sine wave inverter configured with a feedback network causing it to oscillate with an asymmetrical duty cycle between 0.5 Hertz and 10 Hertz.

5. The switch mode power supply of claim 1, wherein the first wave inverter comprises a square wave inverter configured with a feedback network causing it to oscillate with an asymmetrical duty cycle between 0.5 Hertz and 10 Hertz.

6. The switch mode power supply of claim 5, wherein a power rail of the first square wave inverter is connected to a power source via a resistor, and
   wherein the same power rail of the first square wave inverter is additionally connected to the ground terminal via the capacitor.

7. The switch mode power supply of claim 1, wherein the second resistor has a resistance greater than a resistance of the first resistor.

8. The switch mode power supply of claim 1, wherein the detection circuit comprises a bipolar junction transistor (BJT) and a collector of the BJT is connected to the input of the first wave inverter and a base of the BJT is connected to the output of the feedback circuit, such that the BJT is configured to selectively force the protection signal to the enable state.

9. The switch mode power supply of claim 8, wherein the base of the BJT is connected to the output of the feedback circuit via a resistor, the resistor configured to limit current flow from the feedback circuit through the BJT.

10. The switch mode power supply of claim 9, wherein when the feedback signal is in a high state it indicates that an output voltage of the SMPS is too high.

11. A method for protecting a switched mode power supply, comprising:
    a feedback circuit outputting a feedback signal associated with an output of the switched mode power supply;
    a control circuit receiving the feedback signal;
    the control signal selectively generating a switching signal for driving a transformer in the switched mode power supply based on the feedback signal and a state of a protection signal; and
    a protection circuit constraining an average power output of the switch mode power supply, the protection circuit comprising:
    an oscillation circuit comprising a feedback network configured to:
    generate a protection signal with an asymmetric duty cycle oscillating between an enable state and an inhibit state; and provide the protection signal to the control circuit to inhibit the control circuit from generating the switching signal when the protection signal is in the inhibit state;
wherein the feedback network comprises:
a first resistor;
a second resistor in series with the first resistor;
an oscillator in parallel with the first resistor;
a diode in parallel with the first resistor and the oscillator, such that a cathode of the diode is connected between the first resistor and the second resistor; and,
a capacitor connected between the input of the oscillator and a ground terminal; and
a detection circuit receiving the feedback signal and selectively forcing the protection signal to the enable state when the feedback signal indicates that an output voltage is too high.

12. A switch mode power supply, comprising:
a feedback circuit configured to output a feedback signal associated with an output power of the switch mode power supply;
a control circuit configured to receive the feedback signal and selectively generate a switching signal at frequency greater than about one kilohertz for driving a transformer in the switched mode power supply based on the feedback signal and a state of a protection signal; and
a protection circuit configured to constrain an average power output of the switch mode power supply, the protection circuit comprising:
an oscillation circuit comprising a feedback network, configured to:
generate a protection signal with an asymmetric duty cycle oscillating between an enable state and an inhibit state; and
provide the protection signal to the control circuit to inhibit the control circuit from generating the switching signal when the protection signal is in the inhibit state;
wherein the feedback network comprises:
a first resistor;
a second resistor in series with the first resistor;
an oscillator in parallel with the first resistor;
a diode in parallel with the first resistor and the oscillator such that a cathode of the diode is connected between the input of the oscillator and a ground terminal; and
a detection circuit comprising a transistor, the detection circuit configured to receive the feedback signal and selectively force the protection signal to the enable state when the feedback signal indicates that one of an output voltage and an output current is too high.

* * * * *